United States Patent
Kalyuzhny et al.

(10) Patent No.: US 10,713,515 B2
(45) Date of Patent: Jul. 14, 2020

(54) USING MULTIPLE CAMERAS TO PERFORM OPTICAL CHARACTER RECOGNITION

(71) Applicant: ABBYY Development LLC, Moscow (RU)

(72) Inventors: Aleksey Ivanovich Kalyuzhny, Moscow (RU); Aleksey Yevgen'yevich Lebedev, Orenburg (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 15/714,857

(22) Filed: Sep. 25, 2017

(65) Prior Publication Data

US 2019/0065877 A1 Feb. 28, 2019

(30) Foreign Application Priority Data

Aug. 25, 2017 (RU) .................. 2017130192

(51) Int. Cl.
*G06K 9/20* (2006.01)
*G06K 9/00* (2006.01)
*G06K 9/72* (2006.01)
*G06K 9/03* (2006.01)
*G06K 9/62* (2006.01)

(52) U.S. Cl.
CPC ......... *G06K 9/209* (2013.01); *G06K 9/00442* (2013.01); *G06K 9/00469* (2013.01); *G06K 9/00744* (2013.01); *G06K 9/036* (2013.01); *G06K 9/6292* (2013.01); *G06K 9/72* (2013.01); *G06K 2209/01* (2013.01)

(58) Field of Classification Search
CPC .... G06K 9/209; G06K 9/036; G06K 9/00469; G06K 9/72; G06K 9/00744; G06K 2209/01
See application file for complete search history.

(56) References Cited

U.S. PATENT DOCUMENTS

| 6,236,735 B1 | 5/2001 | Bjorner et al. |
| 6,493,469 B1 | 12/2002 | Taylor et al. |
| 9,129,177 B2 | 9/2015 | Baik et al. |

(Continued)

OTHER PUBLICATIONS

Google Photos, PhotoScan—scanner by Google Photos, published Nov. 16, 2016, downloaded May 30, 2017 from: https://web.archive.orgiweb/20161116232842/https://www.google.com/photos/scan/.

*Primary Examiner* — John W Lee
(74) *Attorney, Agent, or Firm* — Lowenstein Sandler LLP

(57) ABSTRACT

The subject matter of this specification can be implemented in, among other things, a method that includes receiving a first image from a first camera depicting a first view of a physical item, where the physical item displays a plurality of characters. The method includes receiving a second image from a second camera depicting a second view of the physical item. The method includes performing optical character recognition on the first image to identify first characters and a first layout in the first image and on the second image to identify second characters and a second layout in the second image. The method includes combining the first characters with the second characters by comparing the first characters with the second characters and the first layout with the second layout. The method includes storing the combined first and second characters.

27 Claims, 7 Drawing Sheets

(56) References Cited

U.S. PATENT DOCUMENTS

| | | | |
|---|---|---|---|
| 9,269,009 B1 | 2/2016 | Liu et al. | |
| 10,068,155 B2 * | 9/2018 | Kalyuzhny | G06K 9/00442 |
| 2005/0286743 A1 * | 12/2005 | Kurzweil | G06K 9/228 |
| | | | 382/114 |
| 2008/0165266 A1 * | 7/2008 | Jenkins | G06F 3/0418 |
| | | | 348/333.01 |
| 2008/0225121 A1 * | 9/2008 | Yoshida | G08B 13/19641 |
| | | | 348/159 |
| 2017/0151390 A1 * | 6/2017 | Muller-Pathle | G06K 9/18 |

* cited by examiner

USING MULTIPLE CAMERAS TO PERFORM OPTICAL CHARACTER RECOGNITION

CROSS-REFERENCE TO RELATED APPLICATIONS

This application claims the benefit of priority under 35 U.S.C. § 119 to Russian Application No. 2017130192, filed Aug. 25, 2017, the disclosure of which is incorporated herein by reference in its entirety.

TECHNICAL FIELD

This instant specification relates to using multiple cameras to perform optical character recognition (OCR) on images of a physical item.

BACKGROUND

Optical character recognition is the mechanical or electronic conversion of images of typed, handwritten or printed text into machine-encoded text, whether from a scanned document, a photo of a document, a scene-photo (for example the text on signs and billboards in a landscape photo) or from subtitle text superimposed on an image (for example from a television broadcast). OCR can be used as a form of information entry from printed paper data records, whether passport documents, invoices, bank statements, computerized receipts, business cards, mail, printouts of static-data, or other documentation. OCR can be used to digitize printed texts so that they can be electronically edited, searched, stored more compactly, and displayed on-line.

DETAILED DESCRIPTION

Figure 1:
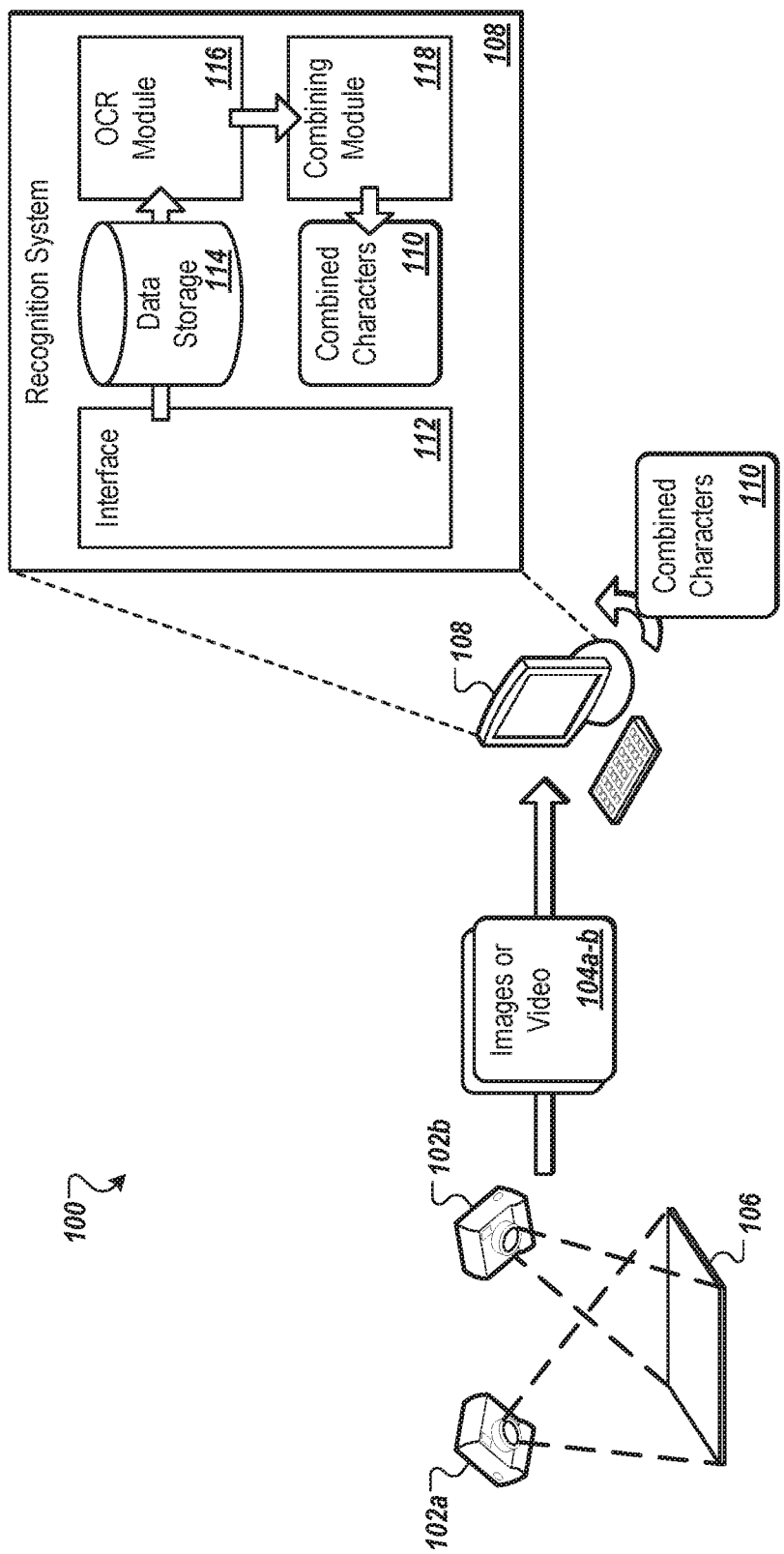
FIG. 1 is a schematic diagram that shows an example of a system for using multiple cameras to perform optical character recognition on images of a physical item.

This document describes systems and techniques for using multiple cameras to perform optical character recognition on a series of images (e.g., a sequence of video frames or still images). Optical character recognition (OCR) can be used to recognize text in a series of video frames to obtain machine-encoded text such as Unicode characters. Some of the frames may contain the same scene or subject matter, such as images of a document, portions of the document, or other subject matter that includes text or symbols capable of being recognized. However, conditions during the creation of the video frames, such as illumination, camera trembling/shaking, or camera angle, can vary from frame to frame in the video. As a result, the frames may differ in quality. For example, portions of some of the frames may contain various defects, such as digital noise, a glare, a smear, or a defocus aberration.

Recognition results from multiple frames can be combined to improve the quality of the document image recognition as compared to the results of recognition of any individual frame alone. However, if the time between the frames to be combined is too small, then the conditions to be corrected change by a slight amount and the resulting frames have a quality that is similar to the original poor quality of the frames. The recognition performed on the frames may have similar results with similar errors. In particular, it may not be possible to effectively remove such defects in the frames as glare, which may result in not being able to detect and recognize a fragment of text within the glare or overexposed areas of the frames. As a result, in order to obtain a level of quality needed to recognize text using OCR, the time between frames to be combined should be increased to a point where illumination or a camera angle, for example, have changed such that the glare or overexposure no longer occurs. Accordingly, a time from a moment the camera is pointed at the document to the display of the recognition result on the screen, which a user may confirm as being correct, may be unacceptably large when combining frames of video from a single camera to correct defects in the frames of video.

A system, computer-readable medium, and method for using multiple cameras to perform optical character recognition on images from a video is disclosed here. Using multiple cameras reduces the amount of time needed for the system to recognize text from the images in the frames of video. For example, rather than repositioning the subject matter being recognized, the camera, and/or the light source, which takes additional time, multiple cameras may be used to receive video or images and perform the combined recognition without waiting for the subject matter, light source, or camera to be moved to change the defect condition. The system, computer-readable medium, and method disclosed allow for removal of systematic recognition errors, that occur for a first positioning or angle of at least a first camera and do not occur for a second positioning or angle of at least a second camera. That is, images from a first camera may have a first defect or glare and images from a second camera may have a second defect or glare. As long as the first defect/glare and the second defect/glare do not coincide, the recognition results of the images from the two cameras may be combined to detect and recognize a fragment of text within the two defects/glares. The camera positions and lighting positions may be chosen so that the defects/glares from the two cameras do not coincide. In some implementations, combining recognition results rather than combining the images prior to performing the recognition may result in better overall recognition, may use fewer processing resources, and/or may take less time to be processed.

The details of one or more implementations are set forth in the accompanying drawings and the description below. Other features and advantages will be apparent from the description and drawings, and from the claims.

FIG. 1 is a schematic diagram that shows an example of a system 100 for using multiple cameras 102a-b to perform optical character recognition on multiple images 104a-b of a physical item 106. The physical item 106 may be a substantially two-dimensional tangible object, such as a hard copy printout of a document, or a three-dimensional tangible object, such as a package. The physical item 106 has characters displayed on the physical item 106, such as the characters of a document or a label with characters on a package. A recognition system 108 may receive the first image 104a from the first camera 102a and the second image 104b from the second camera 102b. While shown in FIG. 1 as a desktop type computing device, the recognition system 108 may be a server device (e.g., mounted in a server rack) or a handheld device (e.g., a smartphone). While shown in FIG. 1 as separate from the recognition system 108, the first camera 102a and/or the second camera 102b may be integrated within the recognition system 108, such as smartphone or other computing device with dual cameras and/or dual lenses. The recognition system 108 separately performs optical character recognition on each of the images 104a-b to produce the corresponding text (recognized characters) and layout information (layout). The layout may associate the recognized characters and/or groups (sets) of characters with their respective positions in the images 104a-b. One or more of the images 104a-b, such as the first image 104a, may have one or more defects, such as glare from a light source that illuminates the physical item 106, that prevent the recognition system 108 from recognizing one or more of the characters displayed on the physical item 106. The recognition system 108 may compare the recognized characters and the layouts produced by the OCR of the images 104a-b and combine the recognized characters from the images 104a-b to generate a combined set of characters 110. The combined set of characters 110 may account for the characters that were prevented from being recognized in the first image 104a by combining the recognized characters from the first image 104a with recognized characters from the second image 104b that correspond to the characters that were prevented from being recognized in the first image 104a. For example, the characters that were prevented from being recognized in the first image 104a may have positions in the first image 104a that correspond to positions of characters recognized in the second image 104b. Combining the recognized characters from two or more images is disclosed, for example, in U.S. patent application Ser. Nos. 15/168,548 and 15/168,525, which are incorporated herein by reference in their entirety.

The recognition system 108 may include an interface 112 for receiving the images 104a-b from the cameras 102a-b. The recognition system 108 may include a data storage 114 that stores the images 104a-b and/or the combined set of characters 110. The recognition system 108 may include instructions for an optical character recognition module 116 that are executed by a processing device to recognize characters and the layouts of the characters in the images 104a-b. The recognition system 108 may include instructions for a combining module 118 that are executed by a processing device to compare the recognized characters and the layouts to combine the recognized characters from the images 104a-b.

Figure 2:
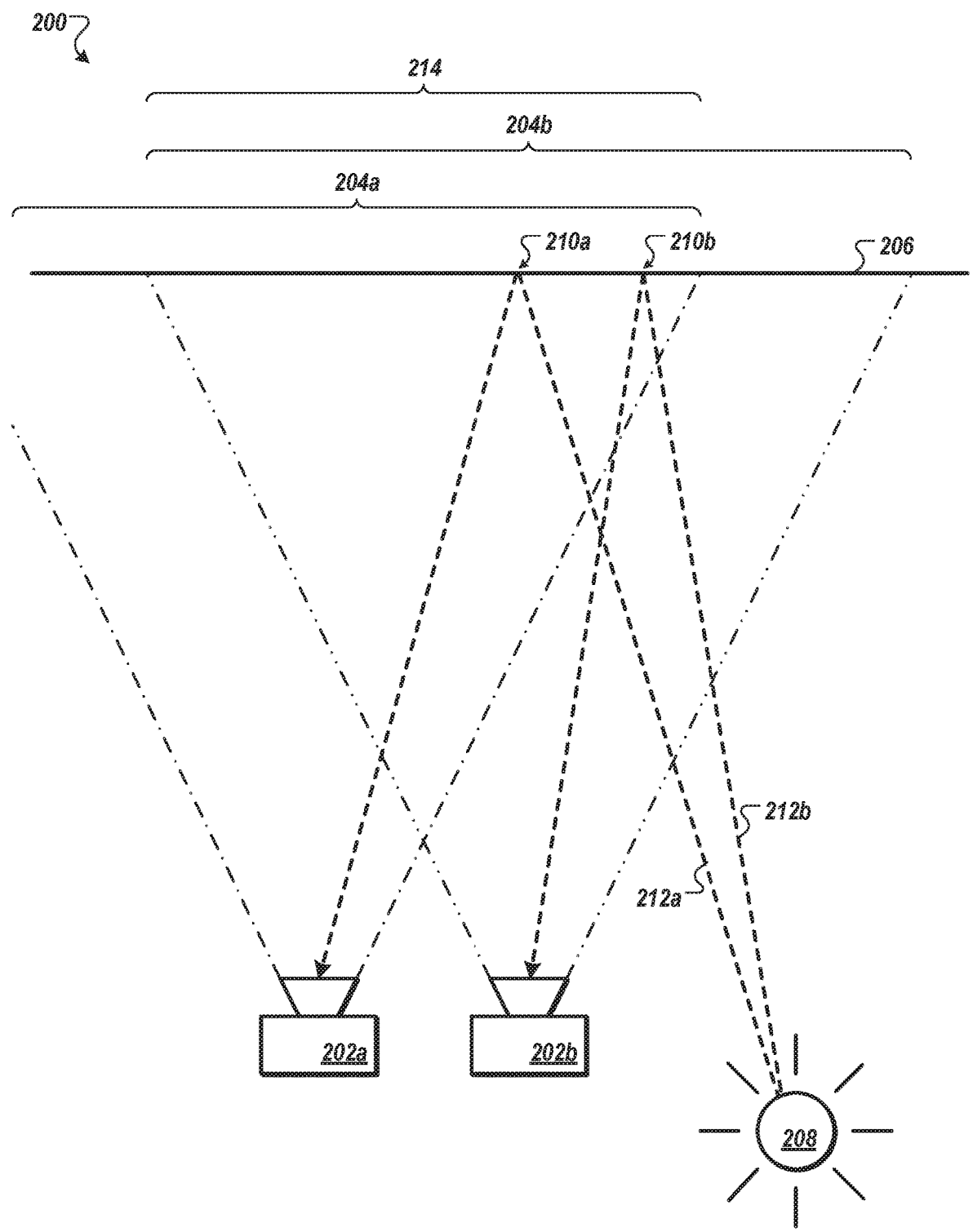
FIG. 2 is a block diagram that shows an example of a system for using multiple cameras to perform optical character recognition on images of a physical item.

FIG. 2 is a block diagram that shows an example of a system 200 for using multiple cameras 202a-b to perform optical character recognition on multiple images 204a-b of a physical item 206. The system 200 includes a light source 208 that illuminates the physical item 206 so that the cameras 202a-b may capture the images 204a-b of the physical item 206, but the light source 208 also creates one or more defects 210a-b in the images 204a-b, such as glares or overexposures from one or more rays of light 212a-b emitted by the light source 208 reflecting off of the physical item 206 and directly entering the cameras 202a-b.

The images 204a-b include an overlapping region 214. The overlapping region 214 includes the first defect 210a in the first image 204a and the second defect 210b in the second image 204b. In some implementations, the defects 210a-b do not overlap with one another. The recognition system 108 can perform optical character recognition on the images 204a-b to recognize characters in the overlapping region 214 for the images 204a-b and then combine the recognized characters from the first image 204a with the corresponding recognized characters from the second image 204b to account for characters that the recognition system 108 was prevented from recognizing in the first image 204a due to the first defect 210a and in the second image 204b due to the second defect 210b. In some implementations, the cameras 202a-b may be arranged so that the overlapping region 214 encompasses the entirety of the physical item 206 to be imaged. In some implementations, the cameras 202a-b may include more than two cameras such that the overlapping regions between pairs of the cameras encompass the entirety of the physical item 206 to be imaged.

Figure 3A:
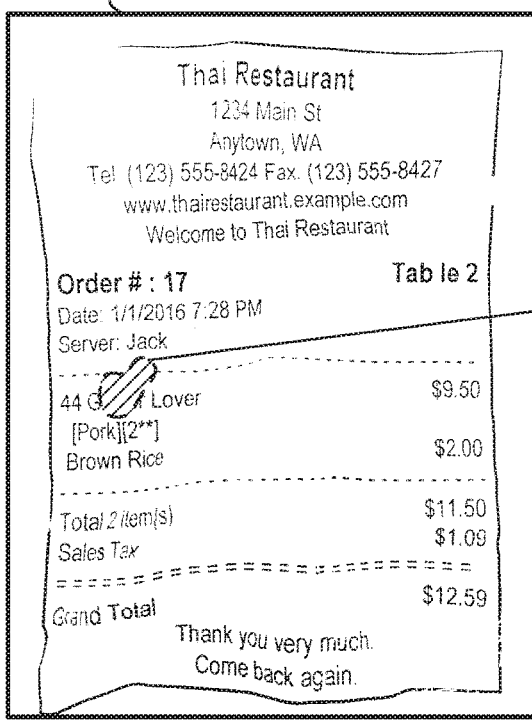
FIGS. 3A-B show examples of multiple images of a physical item.
Figure 3B:
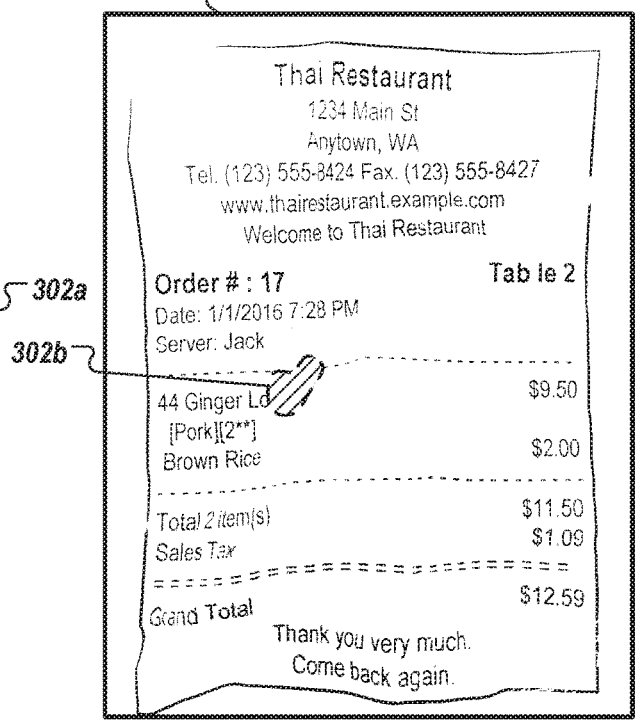

FIGS. 3A-B show examples of multiple images 300a-b of a physical item. The physical item is a receipt from a restaurant, however other physical items may also be used, such as other two-dimensional items (e.g., hard copies of documents) or three-dimensional items (e.g., packages with labels). The images include one or more defects 302a-b, such as glares from the light source 208. Glares may be caused by reflectivity of the surface of the physical item, a material encasing the physical item, and/or a curved surface of the physical item. Alternatively or in addition, the defects 302a-b may be caused by other features of the cameras and or the physical item, such as a smudge or speck of material on the lenses of the cameras.

The physical item includes characters, such as a list of food purchased, prices for the food, tax paid, and information about the restaurant. The recognition system 108 performs optical recognition on the first image 300a to recognize characters including:

44 G Lover $9.50 as the first defect 302a prevents the recognition system 108 from recognizing the characters "inger" in the word "Ginger." The recognition system 108 also recognizes a layout of the recognized characters within the first image 300a, such as absolute positions of the characters within the first image 300a or positions of the characters relative to other objects in the first image 300a (e.g., relative to other characters, a word, a line of text, a paragraph, or a symbol). The layout may associate the recognized characters and/or groups of characters with their respective positions in the first image 300a. The recognition system 108 performs optical recognition on the second image 300b to recognize characters including:

44 Ginger Lo $9.50 as the second defect 302b prevents the recognition system 108 from recognizing the characters "ver" in the word "Lover." The recognition system 108 also recognizes a layout of the recognized characters within the second image 300b, such as absolute positions of the characters within the second image 300b or positions of the characters relative to other objects in the second image 300b (e.g., relative to other characters, a word, a line of text, a paragraph, or a symbol). The layout may associate the recognized characters and/or groups of characters with their respective positions in the second image 300b.

The recognition system 108 associates the recognized characters from the images 300*a-b* that are likely to represent the same series of characters depicted on the physical item. For example, the recognition system 108 may identify one or more characters from the first image 300*a* that correspond to one or more characters from the second image 300*b*, such as the characters "44 G Lo $9.50," by comparing the positions of the characters in the layouts of the images 300*a-b*. Based on the similarities between the layouts of the two sets of recognized characters, the recognition system 108 determines that the two sets of recognized characters represent the same series of characters depicted on the physical item. In response, the recognition system 108 may then combine the two sets of recognized characters to generate the combined set of characters including "44 Ginger Lover $9.50." The recognition system 108 may combine the two sets of recognized characters by maintaining the relative positions of the characters within the sets of recognized characters.

The recognition system 108 may identify matching characters or a sequence of characters (e.g., words) in the OCR produced texts representing the images 300*a-b* that have a low frequency of occurrence within the OCR produced text (e.g., the frequency that does not exceed a specified frequency threshold, which may be set to 1 to reference a unique sequence of symbols). In an illustrative example, a low frequency word may be identified by sorting the OCR produced words in the order of their respective frequencies and selecting a word having the lowest frequency. In certain implementations, the recognition system 108 uses sequences of characters that have a threshold length, since shorter sequences of symbols produce less reliable base points for matching the characters.

The recognition system 108 may employ the layout information, such as coordinates, associated with the recognized characters to identify at least one base point representing each character within each of the images 300*a-b*. In an illustrative example, a base point associated with the sequence of characters may be represented by the center of the minimum bounding rectangle of the sequence of characters. In another illustrative example, two or more base points associated with the identified sequence of characters may be represented by the corners of the minimum bounding rectangle of the sequence of characters.

The recognition system 108 may inspect the identified base points and discard at least some of them in view of filtering criteria. In an illustrative example, the recognition system 108 may verify that arbitrarily selected groups of the matching base points exhibit certain geometric features that are invariant with respect to the images 300*a-b*, such an invariant geometric feature may be represented by a direction of a path traversing at least three matching base points. The recognition system 108 may identify low frequency words in the sequences of characters to produce the base points. The centers of minimum bounding rectangles of the corresponding sequences of characters in each of the images 300*a-b* produce the series of words. If the direction of the paths traversing the base points from the images 300*a-b* yields the same series of words, then the base points are likely to represent matching sequences of characters in the images 300*a-b*, and therefore may be relied upon for performing subsequent operations.

Alternatively or in addition, the recognition system 108 may represent the invariant geometric feature by the direction of the path traversing vectors connecting an arbitrary chosen point (e.g., the origin of the coordinate plane associated with the images 300*a-b*) and each of the base points, in the order that the words were recognized. Further, the recognition system 108 may represent the invariant geometric feature by the topology of geometric shapes produced by lines connecting an arbitrary chosen set of base points of the recognized characters or words.

As described above, the recognition system 108 may identify one or more reference objects, such as the base points, in the first image 300*a* and the second image 300*b*. The reference objects may be one or more characters near the defects 302*a-b* (e.g., above and/or below the defects 302*a-b*) that match between the recognized characters from the first image 300*a* and the second image 300*b*. Alternatively or in addition, the reference objects may be one or more graphic features that match between the first image 300*a* and the second image 300*b* (e.g., an edge or corner of the physical item depicted in the images 300*a-b* or similar shapes in the images 300*a-b*).

The recognition system 108 may further associate the recognized characters from the images 300*a-b* that are likely to represent the same series of characters depicted on the physical item by constructing a coordinate transformation converting coordinates of one image from the images 300*a-b* into coordinates of another image of the images 300*a-b*. The recognition system 108 may identify a projective transformation from locations in the first image 300*a* to locations in the second image 300*b* based on a first location of each of the reference objects in the first image 300*a* relative to a second location of each of the reference objects in the second image 300*b*. For example, the recognition system 108 may calculate transformation rules that map the first location to the second location and use those transformation rules to map locations of the recognized characters from one of the images 300*a-b* to locations in the other of the images 300*a-b* in order to match the locations of characters recognized from the first image 300*a* to locations of characters recognized from the second image 300*b*.

The recognition system 108 may then map an arbitrarily chosen point in the first image 300*a* to the second image 300*b* by applying the projective transformation to the coordinates of the same point in the first image 300*a*. "Projective transformation" herein refers to a transformation that maps lines to lines, but does not necessarily preserve parallelism. A projective transformation can be expressed by the following equations:

$$X = \frac{Ax_1 \times x + Ax_2 \times y + Ax_3}{Ax_4 \times x + Ay_4 \times y + 1} \tag{1}$$

$$Y = \frac{Ay_1 \times x + Ay_2 \times y + Ay_3}{Ax_4 \times x + Ay_4 \times y + 1} \tag{2}$$

wherein (x,y) and (X,Y) represent coordinates of an arbitrary chosen point in the first image 300*a* and the second image 300*b*, respectively. The transformation coefficients $Ax_1$, $Ax_2$, $Ax_3$, $Ax_4$, $Ay_1$, $Ay_2$, $Ay_3$, and $Ay_4$ may be determined based on known coordinates of at least four base points in each of the images 300*a-b*, which would produce a system of eight equations with eight variables. Once the transformation coefficients have been determined, the equations (1) and (2) may be applied to coordinates of an arbitrary chosen point in the first image 300*a* in order to determine coordinates of the same point in the second image 300*b*. In certain implementations, more than four pair of base points may be identified for a given pair of images, in which case the over-determined system may be resolved by regression analysis methods, such as the method of least squares.

The recognition system 108 may associate one or more sequences of characters produced by OCR of the second image 300b with a cluster of matching sequences of characters produced by OCR of one or more previously processed images, such as the first image 300a. The recognition system 108 may employ the above-referenced coordinate transformations to compare positions of recognized character sequences in the images 300a-b, and thus identify groups of character sequences that are likely to represent the same fragment of the original characters depicted on the physical item. In an illustrative example, for an arbitrary chosen character sequence in a text produced by the optical character recognition of the second image 300b, the recognition system 108 may identify one or more matching character sequences produced by the optical character recognition of other images of the images 300a-b. Notably, "matching character sequences" herein refers to both strictly matching and fuzzily matching character sequences.

In certain implementations, the recognition system 108 may produce a graph, the vertices of which represent character sequences from the images 300a-b, and edges interconnect the character sequences that have been identified as matching (e.g., representing the same fragment of the original text) by applying the above-referenced inter-image coordinate transformations. The resulting graph may include a plurality of clusters of vertices, such that each cluster represents two or more matching character sequences. The vertices within each cluster are interconnected by respective edges, while individual clusters may be isolated or weakly connected to each other.

The recognition system 108 may identify the median string of each cluster of matching character sequences, such that the identified median string would represent the OCR result of the associated image fragment. Each cluster may comprise a plurality of matching character sequences, and the OCR result of the associated image fragment may be represented by the median string. In certain implementations, the recognition system 108 may identify the median string as the character sequence having the minimal sum of edit distances to all character sequences of the cluster. The edit distance, which may in an illustrative example be represented by the Levenshtein distance, between a first character sequence and a second character sequence may be equal to the minimum number of single-character edits (e.g., insertions, deletions or substitutions) required to transform the first character sequence into the second character sequence. In certain implementations, the recognition system 108 may reduce the computational complexity of identifying the median string by applying certain heuristics methods. In an illustrative example, the recognition system 108 may heuristically identify the zeroth-order approximation of the median string. The recognition system 108 may then align the character sequences using strictly matching characters within each sequence. In another illustrative example, the recognition system 108 may associate, with each character sequence of the cluster, a weight coefficient reflecting the position of the character sequence within the image or the OCR confidence metric.

The recognition system 108 may identify the order, in which the character sequences representing the above-mentioned clusters should appear in the resulting text. As noted herein above, the images 300a-b representing the original document may depict at least partially overlapping fragments of the physical item, and may differ by the image scale, shooting angle, shutter speed, aperture, image brightness, glaring, presence of external objects that at least partially cover the original text, and/or other image features, visual artifacts, and imaging process parameters. Therefore, the texts produced by the OCR of each individual one of the images 300a-b may differ by one or more words and/or characters being present or absent in each OCR result, by variations in the character sequences representing the words of the original text, and/or by the order of the character sequences.

In certain implementations, the recognition system 108 may compare a plurality of permutations of the character sequences that represent the identified clusters. The recognition system 108 may identify a median permutation as the permutation having the minimal sum of Kendall tau distances to all other permutations. The Kendall tau distance between a first permutation and a second permutation may be equal to the minimum number of swapping operations required by the bubble sort algorithm to transform the first permutation into the second symbol permutation.

Alternatively or in addition, the recognition system 108 may combine two or more matching character sequences, representing the same fragment of the original text, by removing duplicate characters (e.g., multiple ones of the same character occurring at the same location on the physical item), removing conflicting characters (e.g., different characters occurring at the same location on the physical item) based on the confidence in the recognition and/or syntactic and/or semantic agreement with nearby characters, and combining characters into words, phrases, rows, sentences, and/or other syntactic and/or semantic groupings of characters.

The recognition system 108 may then store the combined characters, for example, in the data storage 114 or another data storage. The recognition system 108 or another system may subsequently use the stored combined characters, for example, to index and/or perform a search on the characters displayed on the physical item (e.g., by submitting a search query to a search service for searching through the copy of the displayed characters), to generate a physical copy of the characters displayed on the physical item (e.g., to print out a copy of the displayed characters using a printer device), and/or to modify an editable copy of the characters displayed on the physical item (e.g., within an application for editing a file that stores a copy of the displayed characters).

Figure 4:
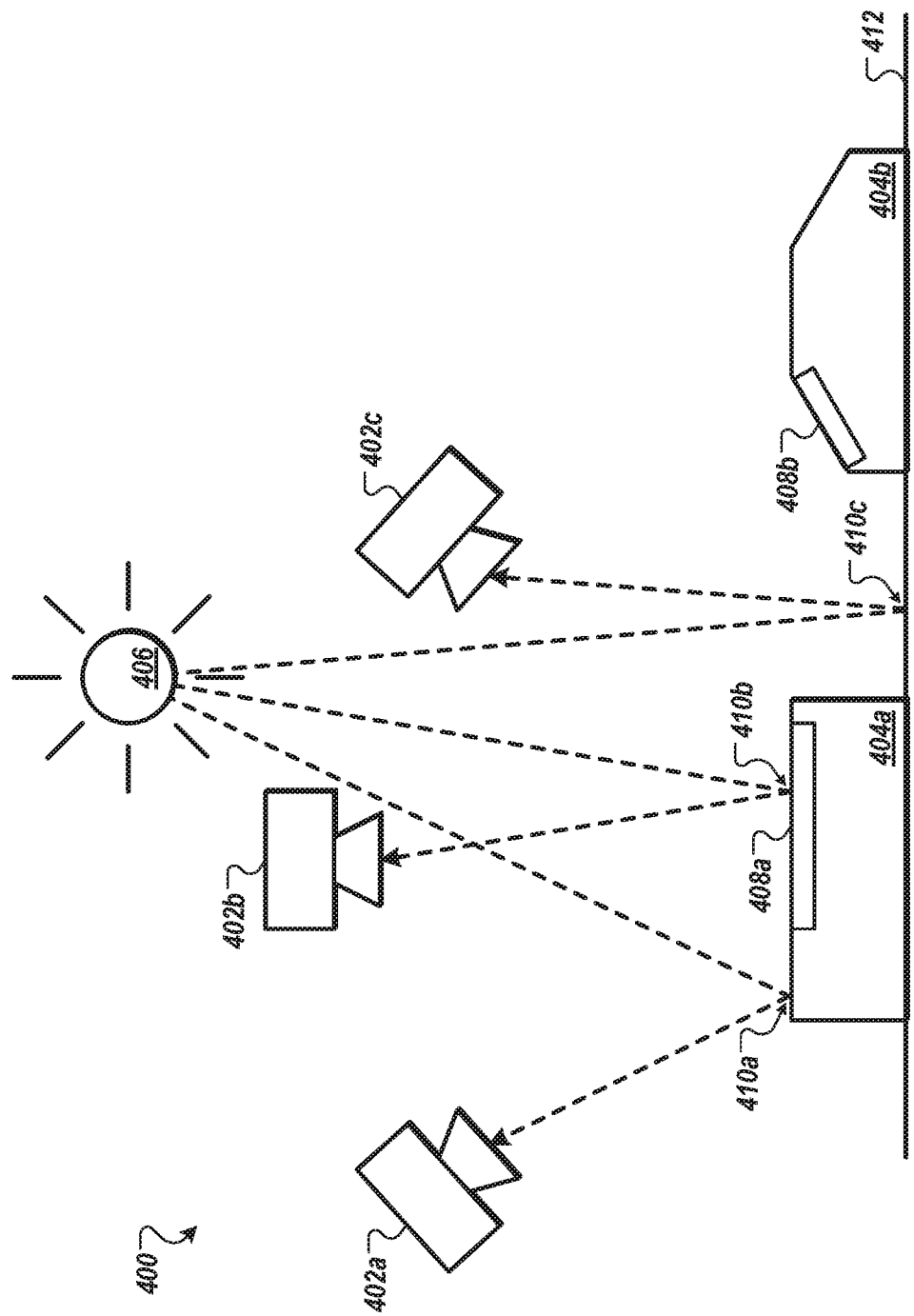
FIG. 4 is a block diagram that shows an example of a system for using multiple cameras to perform optical character recognition on images of one or more physical items.

FIG. 4 is a block diagram that shows an example of a system 400 for using multiple cameras 402a-c to perform optical character recognition on images of one or more physical items 404a-b. The physical items 404a-b may be three-dimensional items that have irregular shapes and/or shapes that are different from one another. The cameras 402a-c may be arranged so that the images from the cameras 402a-c capture all of the surfaces of the physical items 404a-b that may display characters to be recognized. The system 400 includes a light source 406 that illuminates the physical items 404a-b so that the cameras 402a-c may capture the images of the physical items 404a-b. The physical items 404a-b may display the characters, for example, in particular area, such as on one or more labels 408a-b. The labels 408a-b may be placed on varying surfaces of the physical items 404a-b, such as a front side, a rear side, a top side, a bottom side, a left side, and/or a right side, such that one or more or multiple ones of the cameras 402a-c capture images of the labels 408a-b even though one or more of the cameras 402a-c may not be able to capture images of the labels 408a-b. The light source 406 may produce one or more defects 410a-c in the images from corresponding ones of the cameras 402*a-c*. The second defect 410*b* may prevent the recognition system 108 from recognizing the characters on the first label 408*a* in the images from the second camera 402*b*. The recognition system 108 may combine the recognized characters for the first label 408*a* from the images captured by the first camera 402*a* and the third camera 402*c* with the recognized characters for the first label 408*a* from the images captured by the second camera 402*b* to account for the characters that the recognition system 108 was unable to identify due to the second defect 410*b*.

In some implementations, the physical items 404*a-b* remain stationary in the fields of view of the cameras 402*a-c* while the cameras 402*a-c* capture the images of the physical items 404*a-b*. Alternatively or in addition, the physical items 404*a-b* may be placed on a conveyor 412. The conveyor 412 may move each of the physical items 404*a-b* into the fields of view of the cameras 402*a-c*. The cameras 402*a-c* may then capture the images of each of the physical items 404*a-b* as the physical item moves into the fields of view of the cameras 402*a-c*.

The cameras 402*a-c* may individually capture the images of each of the physical items 404*a-b* once the physical item has moved into the fields of view of the cameras 402*a-c*. Alternatively or in addition, the cameras 402*a-c* may continuously or regularly capture the images (e.g., in the case of video) of each of the physical items 404*a-b* regardless of whether the physical item is within the fields of the view of the cameras 402*a-c*.

Each of the cameras 402*a-c* may capture a single image of each of the physical items 404*a-b*. Alternatively or in addition, each of the cameras 402*a-c* may capture multiple images of each of the physical items 404*a-b*. The recognition system 108 may then recognize the characters from the multiple images from each of the cameras 402*a-c* and combine the recognized characters from the multiple images from each of the cameras 402*a-c*. For example, the recognition system 108 may recognize characters in a portion of a first layout from images captured from the first camera 402*a*. The recognition system 108 may not recognize any characters in corresponding portions of layouts from images captured by the second camera 402*b* and the third camera 402*c*. The recognition system 108 may apply a greater weight to the recognized characters from the first camera 402*a* than the lack of recognized characters from the second camera 402*b* and the third camera 402*c*. This may allow the recognition system 108 to use the recognized characters for combining even though the total number of images from the second and third cameras (402*b* and 402*c*) where no characters are recognized is greater than the total number of images from the first camera (402*a*) where characters are recognized.

Figure 5A:
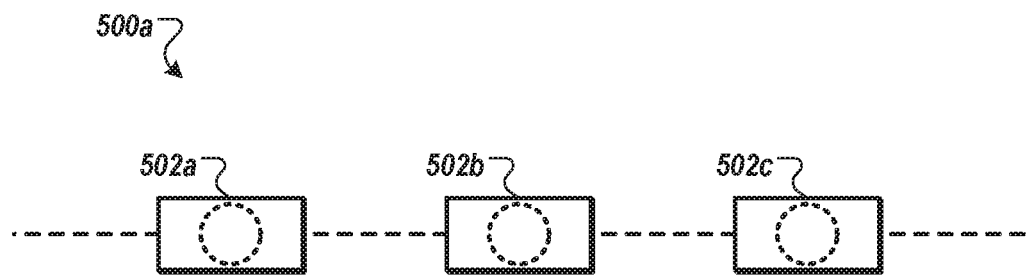
FIGS. 5A-B are block diagrams that show examples of systems for using multiple cameras to perform optical character recognition on images of a physical item.
Figure 5B:
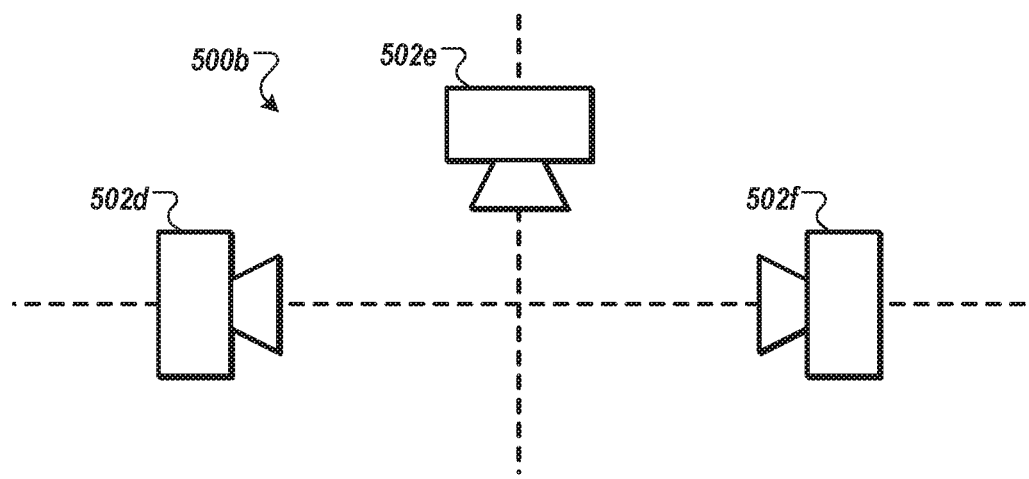

FIGS. 5A-B are block diagrams that show examples of multiple systems 500*a-b* for using multiple cameras 502*a-f* to perform optical character recognition on images of a physical item. The first system 500*a* shows a top-down view where the cameras 502*a-c* are placed in a line, for example, to capture images of two-dimensional physical items. The second system 500*b* shows a top-down view where the cameras 502*d-f* are placed facing one another so that multiple surfaces of a three-dimensional physical item may be captured.

Using multiple cameras may allow images to be captured simultaneously and/or concurrently in order to reduce an amount of time taken to recognize characters displayed on a physical item where one or more defects in the captured images prevent some characters from some of the images from being recognized. Using multiple cameras under different angles relative to the physical item may allow images of text on the three dimensional physical item to be captured no matter how the physical item is oriented within the views of the cameras 502*a-f*.

Figure 6:
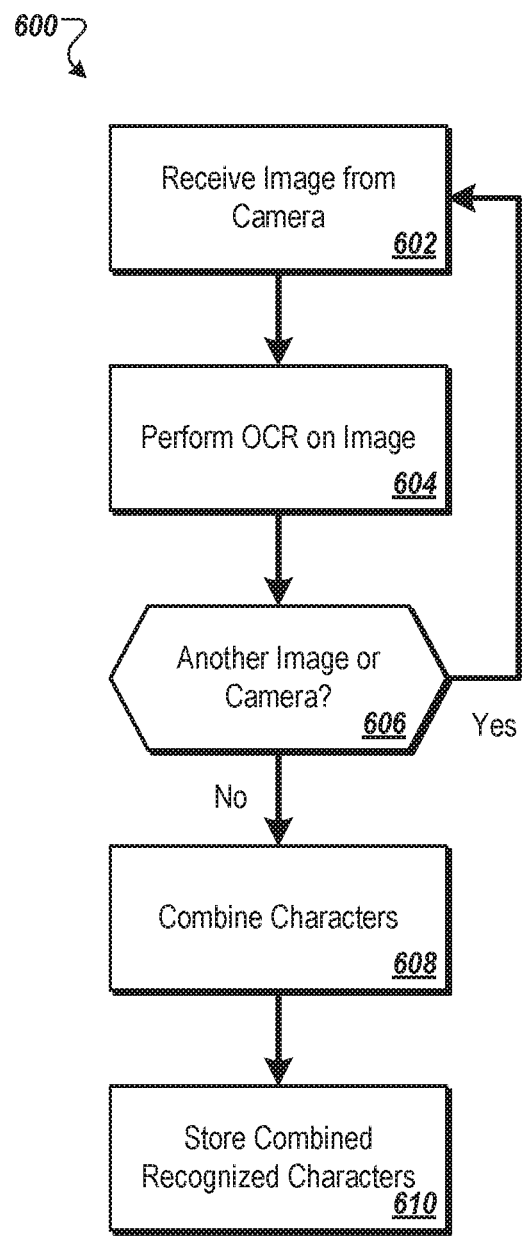
FIG. 6 is flow chart that shows an example of a process for using multiple cameras to perform optical character recognition on images of a physical item.

FIG. 6 is flow chart that shows an example of a process 600 for using multiple cameras to perform optical character recognition on images of a physical item, in accordance with some aspects of the same disclosure. The process 600 may be performed, for example, by a system such as the systems 100, 200, 400, and/or 500*a-b*. For clarity of presentation, the description that follows uses the systems 100, 200, 400, and/or 500*a-b* as examples for describing the process 600. However, another system, or combination of systems, may be used to perform the process 600.

At box 602, the process 600 includes receiving at least one first image from a first camera depicting a first view of a physical item from a first spatial position relative to the physical item. The physical item displays a plurality of characters. For example, the first camera 202*a* may capture the first image 300*a* of the restaurant receipt from a first spatial position relative to the physical item 206.

At box 604, the process 600 includes performing optical character recognition on the first image to identify one or more first characters from ones of the displayed characters on the physical item. For example, the recognition system 108 may execute the instructions of the optical character recognition module 116 to recognize characters in the first image 300*a*, such as the characters including:

44 G Lover $9.50.

Performing the optical character recognition may also include identifying a first layout of the first characters in the first image. For example, the recognition system 108 may execute the instructions of the optical character recognition module 116 to identify the first layout of the first characters in the first image 300*a*. The first layout may include the positions (e.g., absolute positions) of the first characters within the first image 300*a*. The first layout may include the positions (e.g., relative positions) of the first characters within the first image 300*a* relative to other characters or features (e.g., relative to a word, line of text, paragraph, or column of text) within the first image 300*a*.

At box 606, if another image exists, then the process 600 includes repeating boxes 602 and 604, where the process 600 includes receiving at least one second image from a second camera depicting a second view of the physical item from a second spatial position relative to the physical item, and performing optical character recognition on the second image to identify one or more second characters from ones of the displayed characters on the physical item. In addition, the first spatial position is different than the second spatial position. For example, the recognition system 108 may receive the second image 300*b* from the second camera 202*b* and the recognition system 108 may execute the instructions of the optical character recognition module 116 to recognize characters in the second image 300*b*, such as the characters including:

44 Ginger Lo $9.50.

Performing the optical character recognition may also include identifying a second layout of the second characters in the second image. For example, the recognition system 108 may execute the instructions of the optical character recognition module 116 to identify the second layout of the second characters in the second image 300*b*. The second layout may include the positions (e.g., absolute positions) of the second characters within the second image 300*b*. The second layout may include the positions (e.g., relative positions) of the second characters within the second image 300*b* relative to other characters or features (e.g., relative to a word, line of text, paragraph, or column of text) within the second image 300b.

The first image may be a frame of a first video and the second image may be a frame of a second video. For example, the first camera 402a may capture video or a series of images as the physical item 404a moves across the conveyor 412, and the second camera 402b may capture video or a series of images as the physical item 404a moves across the conveyor 412

At box 608, the process 600 includes combining, by at least one processing device, the first characters with the second characters by comparing the first characters with the second characters and the first layout with the second layout. For example, the recognition system 108 may execute the instructions of the combining module 118 to combine the first characters (e.g., "44 G Lover $9.50") from the first image 300a with the second characters (e.g., "44 Ginger Lo $9.50") from the second image 300b to form the combined characters (e.g., "44 Ginger Lover $9.50"). The recognition system 108 may combine the characters by identifying a median string of cluster of the matching character sequences produced by the optical character recognition of the images 300a-b or determining that the sets of characters have a threshold number of characters in common (e.g., "44 G" at the beginning, "Lo" at the middle, and/or "$9.50" at the end of the sets of characters). Alternatively or in addition, the recognition system 108 may map the locations of the first characters from the first layout and the locations of the second characters in the second layout to one another using a transform based on a reference object depicted in both the first image 300a and the second image 300b.

A defect in the first image caused by the first spatial position may prevent one or more of the displayed characters from being identified as the first characters. The defect may be a glare caused by a light source. The second spatial position may not prevent the one or more of the displayed characters from being identified as the second characters, and the combined first and second characters may include the one or more of the displayed characters that were prevented from being identified as the first characters.

At box 610, the process 600 may include storing the combined first and second characters. For example, the recognition system 108 may store the combined characters (e.g., "44 Ginger Lover $9.50") in the data storage 114 and/or another data storage.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 7:
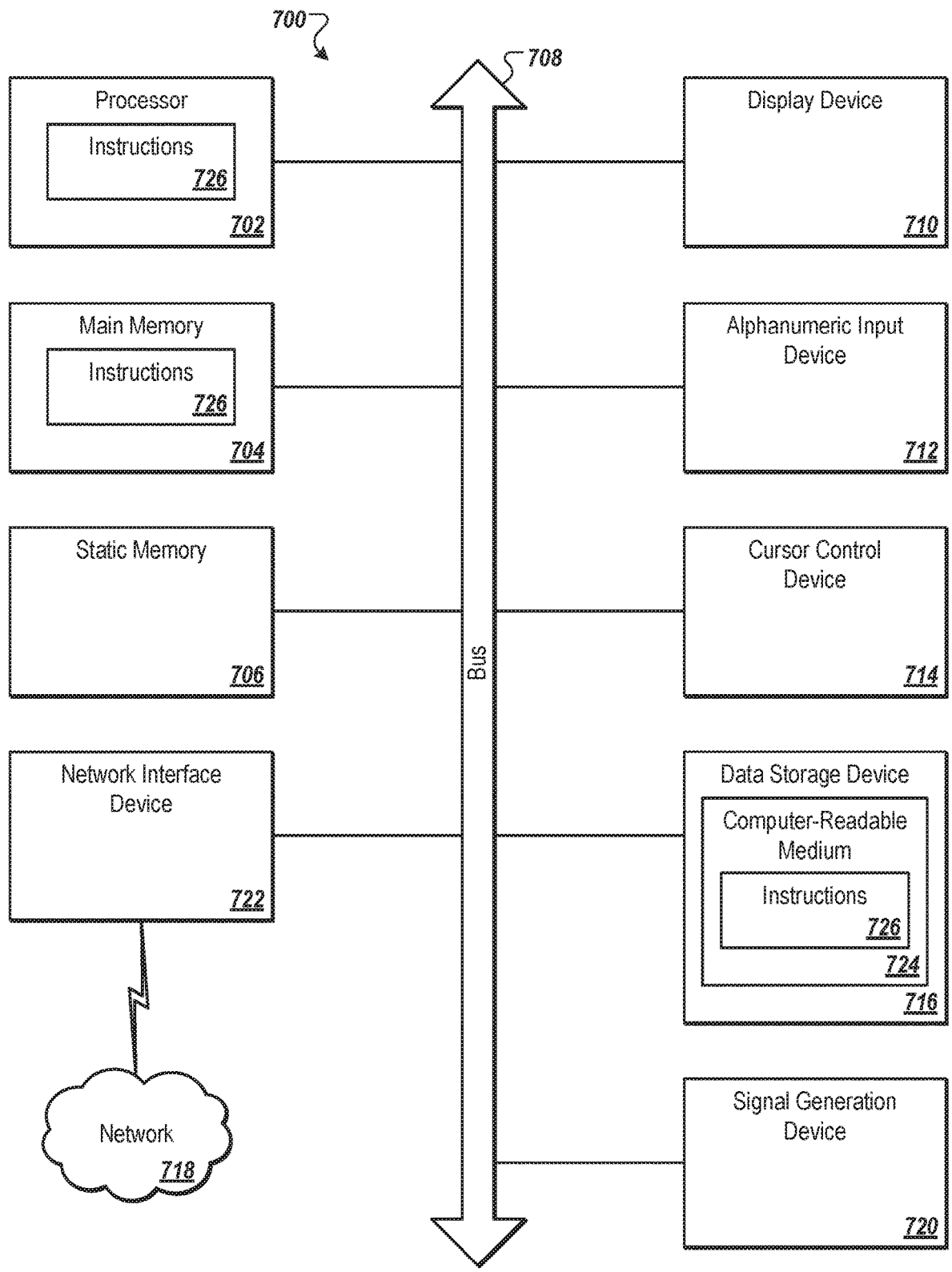
FIG. 7 is a schematic diagram that shows an example of a computing system.

FIG. 7 is a schematic diagram that shows an example of a machine in the form of a computer system 700. The computer system 700 executes one or more sets of instructions 726 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 726 to perform any one or more of the methodologies discussed herein.

The computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions of the systems 100, 200, 400, and/or 500a-b for performing the operations and steps discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored the sets of instructions 726 of the systems 100, 200, 400, and/or 500a-b embodying any one or more of the methodologies or functions described herein. The sets of instructions 726 of the systems 100, 200, 400, and/or 500a-b may also reside, completely or at least partially, within the main memory 704 and/or within the processor 702 during execution thereof by the computer system 700, the main memory 704 and the processor 702 also constituting computer-readable storage media. The sets of instructions 726 may further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions 726. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving one or more first images from a first camera depicting a first view of a physical item from a first spatial position relative to the physical item, wherein the first spatial position comprises a first camera shooting angle relative to the physical item, and wherein the physical item displays a plurality of characters;
    receiving one or more second images from a second camera depicting a second view of the physical item from a second spatial position relative to the physical item, wherein the second spatial position comprises a second camera shooting angle relative to the physical item, and wherein first camera shooting angle of the first spatial position is different than the second camera shooting angle of the second spatial position, wherein the one or more second images captured by the second camera are captured simultaneously with the one or more first images captured by the first camera;
    performing optical character recognition on the first images to identify one or more first characters from ones of the displayed characters on the physical item and a first layout of the first characters in the first images;
    performing optical character recognition on the second images to identify one or more second characters from ones of the displayed characters on the physical item and a second layout of the second characters in the second images;
    combining, by at least one processing device, the first characters from the first images and the second characters from the second images by comparing the first characters with the second characters and the first layout with the second layout, wherein combining the first characters with the second characters comprises applying a greater weight to a portion of the first layout from the first images having one or more recognized characters than the portion of the second layout from the second images having no recognized characters; and
    storing the combined first and second characters.

2. The method of claim 1, wherein one or more defects in the first images caused by the first spatial position prevents one or more of the displayed characters from being identified as the first characters, wherein the second spatial position does not prevent the one or more of the displayed characters from being identified as the second characters, and wherein the combined first and second characters comprise the one or more of the displayed characters that were prevented from being identified as the first characters.

3. The method of claim 2, wherein the defect is a glare caused by a light source.

4. The method of claim 2, wherein the defect is a systematic recognition error.

5. The method of claim 1, wherein the first images are one or more frames of a first video from the first camera and the second images are one or more frames of a second video from the second camera.

6. The method of claim 1, wherein comparing the first layout with the second layout comprises identifying one or more characters in the first characters that correspond to one or more characters in the second characters.

7. The method of claim 1, wherein comparing the first layout with the second layout comprises:
    identifying one or more reference objects in the first images and the second images; and
    identifying a transformation from locations in the first images to locations in the second images based on one or more first locations of the reference objects in the first images relative to one or more second locations of the reference objects in the second images.

8. The method of claim 7, wherein identifying the reference objects comprises identifying one or more base points that are in common between one or more low frequency words that occur in both the first characters and the second characters.

9. The method of claim 1, wherein the first images comprise a plurality of images, wherein the second images comprise a plurality of images, wherein the first characters comprise a plurality of first sets of characters, wherein the second characters comprise a plurality of second sets of characters, and wherein combining the first characters with the second characters comprises identifying a median string of characters from the first sets of characters and the second sets of characters.

10. A non-transitory computer-readable medium having instructions stored therein that, when executed by at least one processing device, cause the processing device to:
    receive one or more first images from a first camera depicting a first view of a physical item from a first spatial position relative to the physical item, wherein the first spatial position comprises a first camera shooting angle relative to the physical item, and wherein the physical item displays a plurality of characters;
    receiving one or more second images from a second camera depicting a second view of the physical item from a second spatial position relative to the physical item, wherein the second spatial position comprises a second camera shooting angle relative to the physical item, and wherein first camera shooting angle of the first spatial position is different than the second camera shooting angle of the second spatial position, wherein the one or more second images captured by the second camera are captured simultaneously with the one or more first images captured by the first camera;
    perform optical character recognition on the first images to identify one or more first characters from ones of the displayed characters on the physical item and a first layout of the first characters in the first images;
    perform optical character recognition on the second images to identify one or more second characters from ones of the displayed characters on the physical item and a second layout of the second characters in the second images;
    combine, by the processing device, the first characters from the first images and the second characters from the second images by a comparison of the first characters with the second characters and the first layout with the second layout, wherein, to combine the first characters with the second characters, the instructions are further to cause the processing device to apply a greater weight to a portion of the first layout from the first images having one or more recognized characters than the portion of the second layout from the second images having no recognized characters; and
    store the combined first and second characters.

11. The computer-readable medium of claim 10, wherein one or more defects in the first images caused by the first spatial position prevents one or more of the displayed characters from being identified as the first characters, wherein the second spatial position does not prevent the one or more of the displayed characters from being identified as the second characters, and wherein the combined first and second characters comprise the one or more of the displayed characters that were prevented from being identified as the first characters.

12. The computer-readable medium of claim 11, wherein the defect is a glare caused by a light source.

13. The computer-readable medium of claim 11, wherein the defect is a systematic recognition error.

14. The computer-readable medium of claim 10, wherein the first images are one or more frames of a first video from the first camera and the second images are one or more frames of a second video from the second camera.

15. The computer-readable medium of claim 10, wherein the comparison of the first layout with the second layout comprises an identification of one or more characters in the first characters that correspond to one or more characters in the second characters.

16. The computer-readable medium of claim 10, wherein the comparison of the first layout with the second layout comprises:
    an identification of one or more reference objects in the first images and the second images; and
    an identification of a transformation from locations in the first images to locations in the second images based on one or more first locations of the reference objects in the first images relative to one or more second locations of the reference objects in the second images.

17. The computer-readable medium of claim 16, wherein, to identify the reference objects, the instructions are further to cause the processing device to identify one or more base points that are in common between one or more low frequency words that occur in both the first characters and the second characters.

18. The computer-readable medium of claim 10, wherein the first images comprise a plurality of images, wherein the second images comprise a plurality of images, wherein the first characters comprise a plurality of first sets of characters, wherein the second characters comprise a plurality of second sets of characters, and wherein, to combine the first characters with the second characters, the instructions are further to cause the processing device to identify a median string of characters from the first sets of characters and the second sets of characters.

19. A system comprising:
    at least one memory that stores instructions; and at least one processing device configured to execute the instructions to:

receive one or more first images from a first camera depicting a first view of a physical item from a first spatial position relative to the physical item, wherein the first spatial position comprises a first camera shooting angle relative to the physical item, and wherein the physical item displays a plurality of characters;

receiving one or more second images from a second camera depicting a second view of the physical item from a second spatial position relative to the physical item, wherein the second spatial position comprises a second camera shooting angle relative to the physical item, and wherein first camera shooting angle of the first spatial position is different than the second camera shooting angle of the second spatial position, wherein the one or more second images captured by the second camera are captured simultaneously with the one or more first images captured by the first camera;

perform optical character recognition on the first images to identify one or more first characters from ones of the displayed characters on the physical item and a first layout of the first characters in the first images;

perform optical character recognition on the second images to identify one or more second characters from ones of the displayed characters on the physical item and a second layout of the second characters in the second images;

combine the first characters from the first images and the second characters from the second images by a comparison of the first characters with the second characters and the first layout with the second layout, wherein, to combine the first characters with the second characters, the at least one processing device is further to execute the instructions to apply a greater weight to a portion of the first layout from the first images having one or more recognized characters than the portion of the second layout from the second images having no recognized characters; and store the combined first and second characters.

20. The system of claim 19, wherein one or more defects in the first images caused by the first spatial position prevents one or more of the displayed characters from being identified as the first characters, wherein the second spatial position does not prevent the one or more of the displayed characters from being identified as the second characters, and wherein the combined first and second characters comprise the one or more of the displayed characters that were prevented from being identified as the first characters.

21. The system of claim 20, wherein the defect is a glare caused by a light source.

22. The system of claim 20, wherein the defect is a systematic recognition error.

23. The system of claim 19, wherein the first images are one or more frames of a first video from the first camera and the second images are one or more frames of a second video from the second camera.

24. The system of claim 19, wherein the comparison of the first layout with the second layout comprises an identification of one or more characters in the first characters that correspond to one or more characters in the second characters.

25. The system of claim 19, wherein the comparison of the first layout with the second layout comprises:

an identification of a reference object in the first images and the second images; and an identification of a transformation from locations in the first images to locations in the second images based on a first location of the reference object in the first images relative to a second location of the reference object in the second images.

26. The system of claim 25, wherein, to identify the reference objects, the processing device is further to execute the instructions to identify one or more base points that are in common between one or more low frequency words that occur in both the first characters and the second characters.

27. The system of claim 19, wherein the first images comprise a plurality of images, wherein the second images comprise a plurality of images, wherein the first characters comprise a plurality of first sets of characters, wherein the second characters comprise a plurality of second sets of characters, and wherein, to combine the first characters with the second characters, the processing device is further to execute the instructions to identify a median string of characters from the first sets of characters and the second sets of characters.

* * * * *